United States Patent
Becker et al.

(10) Patent No.: US 7,128,944 B2
(45) Date of Patent: Oct. 31, 2006

(54) METHOD FOR MAKING THERMALLY TEMPERED GLASS COMPRISING A NON-ABRASIVE, POROUS, $SiO_2$ ANTIREFLECTION LAYER

(75) Inventors: Hans-Joachim Becker, Markt Erlbach (DE); Armin Dauwalter, Fuerth (DE); Andreas Gombert, Freiburg (DE); Walther Glaubitt, Margetshoechheim (DE); Thomas Hofmann, Fuerth (DE); Monika Kursawe, Seeheim-Jugenheim (DE)

(73) Assignee: Flabeg Solarglas GmbH & Co., KG, Fuerth (DE)

(*) Notice: Subject to any disclaimer, the term of this patent is extended or adjusted under 35 U.S.C. 154(b) by 199 days.

(21) Appl. No.: 10/399,439

(22) PCT Filed: Oct. 17, 2001

(86) PCT No.: PCT/EP01/12021

§ 371 (c)(1),
(2), (4) Date: Sep. 3, 2003

(87) PCT Pub. No.: WO02/32823

PCT Pub. Date: Apr. 25, 2002

(65) Prior Publication Data

US 2004/0028918 A1    Feb. 12, 2004

(30) Foreign Application Priority Data

Oct. 18, 2000   (DE) ............................... 100 51 724

(51) Int. Cl.
*B05D 5/06* (2006.01)

(52) U.S. Cl. .................. 427/162; 427/163.1; 427/165; 427/168; 427/169; 427/226; 427/372.2; 427/376.2; 427/377; 427/379; 427/380; 427/397.7; 65/60.1; 65/60.5; 65/60.53; 65/114; 65/117

(58) Field of Classification Search ............. 427/163.1, 427/165, 168, 169, 226, 372.2, 376.2, 377, 427/379, 380, 397.7; 65/60.1, 60.5, 60.53, 65/114, 117

See application file for complete search history.

(56) References Cited

U.S. PATENT DOCUMENTS 2,601,123 A    6/1952   Moulton ..................... 106/287

(Continued)

FOREIGN PATENT DOCUMENTS

DE    693 04 016 T2    12/1996

(Continued)

OTHER PUBLICATIONS

A. Gombert et al., "Subwavelength-structured Antireflective Surfaces on Glass", Thin Solid Films (1999) 73-78, Elsevier Science S.A.

(Continued)

*Primary Examiner*—Alain L. Bashore
(74) *Attorney, Agent, or Firm*—Darby & Darby

(57) ABSTRACT

The invention relates to thermally tempered safety glass comprising an non-abrasive and porous $SiO_2$ layer which is stable during sintering and has a refractive index of between 1.25 and 1.40. The inventive safety glass can be obtained by coating standard soda-lime glass with an aqueous coating solution having a pH value of between 3 and 8 and containing between 0.5 and 5.0 wt. % of $[SiO_x(OH)_y]_n$ particles (0<y<4 and 0<x<2) having a particle size of between 10 and 60 nm, and a surfactant mixture. The coated glass is then dried, thermally hardened at temperatures of at least 600° C. for several minutes, and thermally tempered by a flow of air.

12 Claims, 1 Drawing Sheet

U.S. PATENT DOCUMENTS

| | | | | |
|---|---|---|---|---|
| 4,019,884 | A | | 4/1977 | Elmer et al. ................. 65/30 R |
| 4,535,026 | A | | 8/1985 | Yoldas et al. ............ 428/310.5 |
| 4,830,879 | A | * | 5/1989 | Debsikdar ................... 427/162 |
| 5,049,414 | A | * | 9/1991 | Kato ........................... 427/164 |
| 5,112,676 | A | * | 5/1992 | Cot et al. .................... 427/226 |
| 5,394,269 | A | | 2/1995 | Takamatsu et al. ......... 359/580 |
| 5,858,457 | A | * | 1/1999 | Brinker et al. .............. 427/162 |
| 5,858,462 | A | * | 1/1999 | Yamazaki ................... 427/226 |
| 6,001,485 | A | * | 12/1999 | Kobayashi et al. ......... 428/428 |
| 6,177,131 | B1 | | 1/2001 | Glaubitt et al. ............. 427/162 |
| 6,410,173 | B1 | * | 6/2002 | Arfsten et al. .............. 428/701 |
| 6,514,574 | B1 | * | 2/2003 | Valeri et al. ................ 427/515 |
| 2001/0051213 | A1 | | 12/2001 | Schulz et al. ............... 427/162 |
| 2002/0090519 | A1 | | 7/2002 | Kursawe et al. ............ 428/428 |
| 2003/0129315 | A1 | * | 7/2003 | Suyal et al. ............. 427/397.7 |

FOREIGN PATENT DOCUMENTS

| | | |
|---|---|---|
| DE | 19828231 | 2/1999 |
| DE | 199 18 811 | 11/2000 |
| DE | 10051725 | 5/2002 |
| EP | 0835849 | 4/1998 |
| EP | 0897898 | 2/1999 |
| WO | 0064830 | 11/2000 |
| WO | WO 00/64830 | 11/2000 |

OTHER PUBLICATIONS

A. Gombert et al., "Glazing with Very High Solar Transmittance", Solar Energy vol. 62, No. 3, pp. 177-188, 1998, Elsevier Science Ltd.

A. Gombert et al., "Antireflective Transparent Covers for Solar Devices", Solar Energy vol. 4, pp. 357-360, 2000, Elsevier Science Ltd.

W. Glaubitt et al., "High Transmission Float Glass for Solar Applications", Glass Science and Technology, Jun. 2000, Verlag der Glastechnischen Gesellschaft, Germany.

C.J. Brinker; G.W. Scherr, 'Sol-Gel Science', Academic Press 1990, p. 104, Fig. 5 and p. 583.

'Sol-Gel Science', Klimentova et al., p. 389.

K. Cathro et al., 'Silica Low-Reflection Coatings for Collector Covers, by a Dip-Coating Process', Solar Energy, vol. 32, No. 5, (1984), pp. 573-579.

DIN 1249-12/prEN 12150, Nov. 2000, (discussed in specification).

* cited by examiner

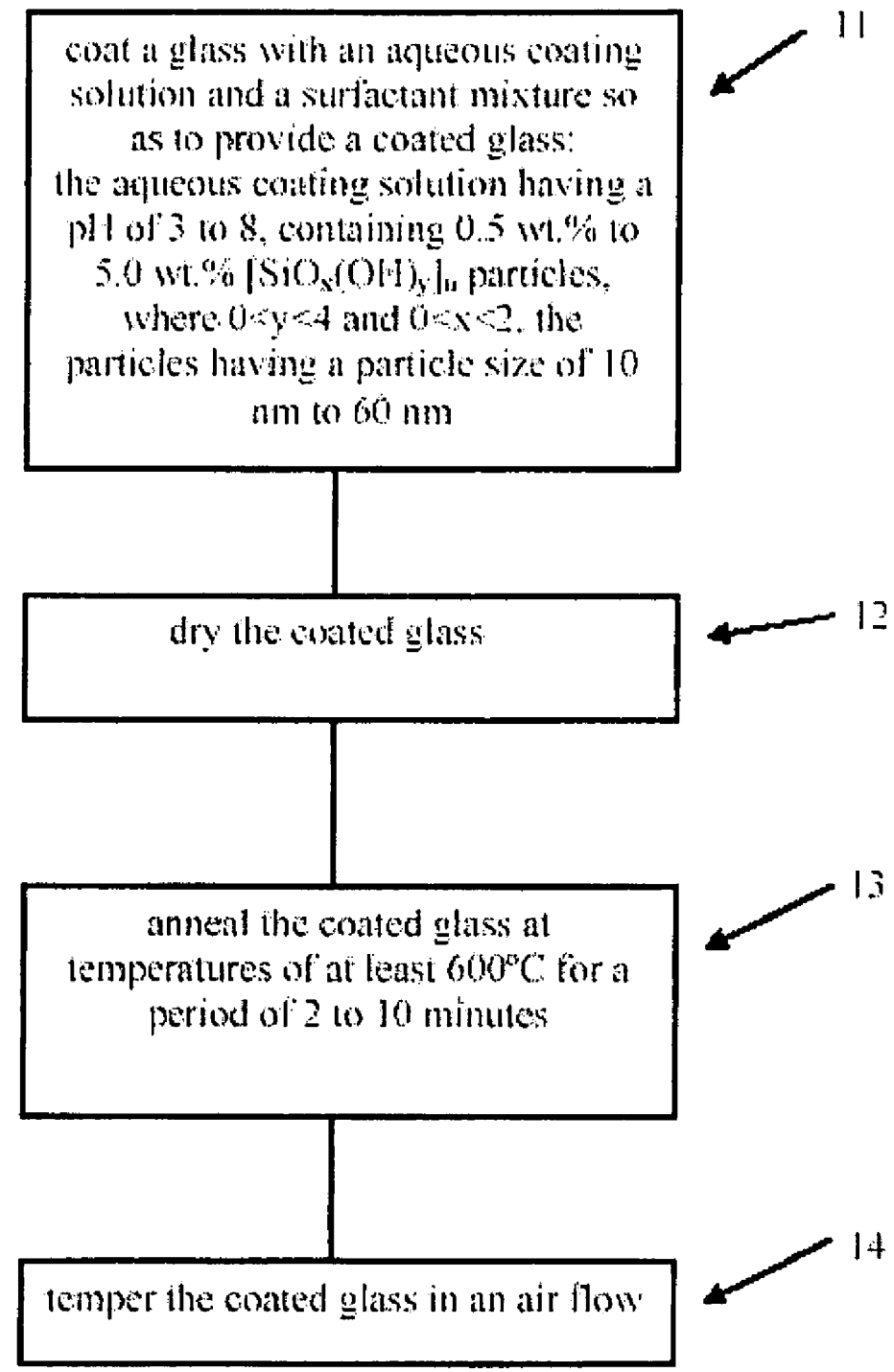

METHOD FOR MAKING THERMALLY TEMPERED GLASS COMPRISING A NON-ABRASIVE, POROUS, SIO₂ ANTIREFLECTION LAYER

The present invention relates to a thermally tempered safety glass provided with a porous SiO₂ antireflection layer and to a method of manufacturing same.

Such a porous SiO₂ antireflection coating results in an increase in transmission over the entire range of the sunlight's spectrum and therefore also reduces undesirable reflections. Such a safety glass is therefore particularly suitable for solar applications, e.g., for covers of solar panels and photovoltaic cells. It may be, however, also used in other areas such as motor vehicle windshields or window and construction glazing.

When light passes through the boundary surface between two media having different refractive indices, part of the beam is reflected. When light hits a glass pane having a refractive index n=1.5 perpendicularly to the pane surface, the reflected portion upon incidence at the glass is approximately 4%. The same portion is also reflected when the light exits the glass. If the light hits the boundary surface at an angle, usually a much larger portion is reflected. These losses result in a reduction of the efficiency of solar systems such as photovoltaic cells or solar panels which are normally covered with glass.

Standard industrial methods of reducing glass reflectivity use the interference principle by alternately applying two or more layers of high-reflectivity and low-reflectivity materials one on top of the other. In a certain wavelength range, the waves reflected on the individual boundary surfaces cancel each other out. This effect turns into increased reflection for wavelengths that are twice the design wavelengths. The band width of reflectivity reduction is physically limited to a maximum of one octave and therefore such systems are unsuitable for solar applications due to the broadband solar spectrum.

The technical solution is provided by a physical principle that has long been known and which is also based on interference effects; however, the required low refractive indices of the coating are achieved by diluting a coating material with air. These simple layers result in an excellent antireflection effect if their refractive index corresponds to the square root of that of the glass substrate. For example, if a λ/4 thick layer is applied to glass having n=1.5, destructive interference occurs, i.e., cancellation of the reflected air/layer phase transition and layer/glass phase transition components. For optimum reduction of reflection in glass, the refractive index must be 1.22 to achieve a reflection close to zero for wavelength λ. This low refractive index cannot be achieved using thick layers.

Development of porous simple layers on glass having such a low refractive index began as early as the 1950s. The methods that have been described since then include direct etching of glass, application of porous layers, as well as a combination of both, i.e., subsequent etching of low-porosity layers.

Porous layers produced by etching glass are characterized by excellent optical properties. Glasses that undergo phase separation, such as borosilicate glass (U.S. Pat. No. 4,019,884) are particularly suitable for this purpose. The disadvantage of this method is the use of environmentally harmful acids such as hydrofluoric acid, and the inhomogeneity of the layers.

U.S. Pat. No. 4,535,026 describes subsequent etching of glasses previously provided with a porous SiO₂ layer. The coating solution used here is obtained by treating silicon alkoxide with water and a catalyst in alcohol. The dried gel layer is heated to remove organic components and generate sufficient abrasion resistance of the layer. A porous SiO₂ layer is obtained, a subsequent etching operation being necessary, however, to enlarge the pores. Using this method, an antireflection layer having 0.1% residual reflection may be ultimately obtained.

The preparation of a coating solution making the manufacture of a suitable abrasion-resistant or abrasion-stable, porous SiO₂ antireflection layer possible, which does not need to be subsequently etched, has not been described to date. In contrast, a generally accepted procedure in manufacturing porous antireflection layers only includes exposing SiO₂ gel layers to temperatures up to 500° C. to produce porosity in the layer and prevent the pores from becoming smaller as the layer is sintered. Thus the refractive index of the layer would increase and the effect of the antireflection layer would deteriorate (Sol Gel Science, C. J. Brinker, G. W. Scherr, Academic Press 1990, p. 583). Exposing the gel layer to maximum possible temperatures is, however, necessary, to achieve good abrasion resistance of the layer by crosslinking of the orthosilicic acid network in the layer. Cathro et al. describe in Solar Energy 32, 1984, p. 573, that sufficiently wipe resistant SiO₂ antireflection layers would be obtained on glass only by exposure to temperatures of at least 500° C. Moulton et al. point out in U.S. Pat. No. 2,601,123 that the temperature in annealing the gel layer should be in the softening range of glass.

For thermal glass toughening or shaping processes, temperatures over 600° C. are required. At these temperatures glass is oftened and subsequently tempered by a rapid forced air flow. In this process, tension states are frozen in, which results in higher breakage resistance and breakage characteristics with very small and therefore harmless fragments.

As discussed above, it is known from the related art that at temperatures required for thermal tempering, the SiO₂ structure is usually sintered, the refractive index increases, and the SiO₂ layer loses its antireflection properties. In addition, thermally tempered safety glass cannot be provided with an abrasion-resistant antireflection layer because it cannot be heated to temperatures around 500° C. after coating without the glass losing its tempering and thus its safety glass properties.

SUMMARY OF THE INVENTION

An object of the present invention is to manufacture a thermally tempered glass or safety glass which is provided with an abrasion-resistant antireflection layer whose refractive index is in the range of 1.25 to 1.40. Furthermore, a method of manufacturing such a safety glass is to be provided.

The present invention provides a safety glass that includes a thermally toughened soda-lime glass and an abrasion-resistant, porous SiO₂ layer on the glass having a refractive index in the range of 1.25 to 1.40. The SiO₂ layer is formed by coating the glass with an aqueous coating solution and a surfactant mixture, the aqueous coating solution having a pH of 3 to 8, containing 0.5 wt. % to 5.0 wt. % $[SiO_x(OH)_y]_n$ having a particle size of 10 nm to 60 nm. where $0<y<4$ and $0<x<2$, and a surfactant mixture, drying the coated glass, thermal toughening at temperatures of at least 600° C., and thermal tempering of the coated glass by a forced air flow. The SiO₂ layer advantageously has a refractive index of 1.25 to 1.38, the residual reflection of the coated glass or pane being less than 3%, in particular approximately 1% of the entire glass, while an uncoated glass has a reflection of approximately 8%.

The present invention also provides a method of manufacturing a safety glass that includes coating a glass with an aqueous coating solution and a surfactant mixture so as to provide a coated glass. The aqueous coating solution has a pH of 3 to 8, containing 0.5 wt. % to 5.0 wt. % $[SiO_x(OH)_y]_n$ particles, where $0<y<4$ and $0<x<2$, the particles having a particle size of 10 nm to 60 nm. The method also includes drying the coated glass, annealing the coated glass at temperatures of at least 600° C. for a period of 2 to 10 minutes, and tempering the coated glass in an air flow.

For this purpose, a standard soda-lime glass in particular is coated with an aqueous coating solution having a pH value of 3 to 8, containing 0.5 to 5.0 wt. % $[SiO_x(OH)_y]_n$ particles having a particle size of 10 to 60 nm and a surfactant mixture, where $0<y<4$ and $0<x<2$. The coated glass is dried by letting it rest at room temperature or by accelerated drying in an air flow. The dried glass is annealed at temperatures of at least 600° C. for a period of 2 to 10 minutes, and the heated glass is evenly tempered on the surfaces on both sides in an air flow to achieve the tempering effect.

The approach according to the present invention is surprising to those skilled in the art, because it is known from the standard reference book of sol-gel technology by C. J. Brinker and G. W. Scherer *Sol-Gel Science*, Academic Press 1990, p. 104, FIG. 5, that the PZC (point of zero charge) and IEP (isoelectric point) of $SiO_2$ particles at pH=2 is zero, and therefore the stability of the sol is maximum. Therefore, it was not expected that the sol would still have sufficient stability at a pH greater than 3.

It is known that the properties of materials obtained by sol-gel methods are highly dependent on the pH. Therefore, it is surprising that the applied layer has such a high strength, since it is known from the research by Klimentova (*Sol-Gel Science*, p. 389) that the elasticity modulus of gel layers is maximum at the isoelectric point of the $SiO_2$ particles. For this reason, those skilled in the art would have set the sol pH at 2. In addition, a considerably increased abrasion resistance (by a factor of approximately 10) was achieved.

An additional object of the present invention is the use of the safety glass according to the present invention for covering solar energy systems, for motor vehicle windshields, and for window and construction glazing.

All types of glass which are normally used in the manufacture of thermally tempered safety glasses may be used. Soda-lime glasses are predominantly used.

The aqueous coating solution has a pH of 3 to 8 and contains 0.5 to 5.0 wt. % $[SiO_x(OH)_y]_n$ particles, where $0<y<4$ and $0<x<2$, with a particle size of 10 to 60 nm with a tolerance of ±10%, and 0.005 to 0.5 wt. % of a surfactant mixture. The surfactant mixture has 15 wt. % to 30 wt. % anionic surfactants, 5 wt. % to 15 wt. % non-ionic surfactants, and less than 5 wt. % of amphoteric surfactants.

The coating solution is produced by:
adding a tetraalkoxysilane to an aqueous-alcohol-ammonia hydrolysis mixture at temperatures between 35° C. and 80° C.;
separating ammonia and alcohol from the dispersion obtained by steam distillation and setting the pH at 3 to 8; and
adding 0.005 wt. % to 0.5 wt. %, based on the coating solution, of a surfactant mixture of 15 wt. % to 30 wt. % anionic surfactants, 5 wt. % to 15 wt. % of non-ionic surfactants, and less than 5 wt. % of amphoteric surfactants.

The aqueous coating solution is stable against gelling within the observation period to date of approximately two years. The particles in the coating solution have a spherical shape and a mean particle diameter of 10 nm to 60 nm, in particular 30 nm to 40 nm, preferably 35 nm with a tolerance of ±10%.

Compared to the aqueous sol known from German Patent 198 28 231, the coating solution according to the present invention exhibits a considerably weaker Tyndall effect, which is an indicator of the low degree of agglomeration of the particles in the solution. The refractive index of the porous layer obtained using the coating solution may be set at 1.25 to less than 1.40, so that the residual reflection of a coated, low-iron glass pane is between 0.3% and 3%, preferably between 0.5% and 1%. The reflection minimum may be easily set by the layer thickness in the range of 500 nm to 800 nm.

The coating solution is set at a solid content of 0.5 wt % to 5 wt. %. The solids content is a function of the type of coating method.

In a special embodiment of the coating solutions according to the present invention, 0.001 wt. % to 0.1 wt. %, based on the coating solution, of a suitable preservative is added.

In a further embodiment, solvents such as lower alcohols having a chain length of C1 to C4, dichloromethane, dioxane, tetrahydrofurane, 2-methoxy-1-propanol, 2-butanon, cyclohexanon, or acetone are added to the coating solution in a concentration of 0.5 wt. % to 50 wt. % based on the coating solution. Ethanol in a concentration of 15 wt. % to 25 wt. % is preferably used.

The coating solution is described in German Patent Application 100 51 725 (not a prior publication). The coating solution is applied to the glass by the usual method. Suitable methods include dip coating, spraying, or spin coating. Dip coating is the preferred method. Pulling rates in the dip coating method are in the range of 0.5 cm/min. to 50 cm/min.

The parameters of the coating procedure and the external conditions such as temperature and humidity must be precisely adjusted to one another as a function of the required layer thickness. This, however, is part of the technical knowledge of those skilled in the art of coating.

Subsequently, the coated glass is pre-dried using air either by simple airing or by forced air flow and then heated to temperatures of at least 600° C. This removes the organic components of the coating, the orthosilicic acid network is toughened, and the resulting porous $SiO_2$ structure acquires proper adherence to the glass surface. Subsequently, the glass is thermally tempered by a forced air flow, so that it acquires the corresponding properties of thermally tempered single-pane safety glass (according to DIN 1249-12/prEN 12150).

Another advantage of the method according to the present invention is that wipe- and abrasion-resistant antireflection layers are obtainable after as little as a few minutes of annealing.

The method according to the present invention permits, for the first time, a thermally tempered safety glass having porous, antireflection layers to be manufactured. The safety glass according to the present invention is used, for example, for covering solar energy systems such as solar panels and photovoltaic cells to increase the operating efficiency of such systems due to the increased transmission.

In a particular embodiment of the method according to the present invention, the glass provided with a porous $SiO_2$ gel layer is subjected to an intermediary treatment prior to the toughening process. It is dipped in an aqueous solution of inorganic salts in the concentration range of 0.1 wt. % to 10 wt. % or in pure water. The glass is pulled out of the dip bath at a pulling rate of 1 cm/min. to 10 cm/min., dried as usual and annealed at 50° C. to 300° C. for 10 min. to 15 min.

In another embodiment of the method according to the present invention, the coated and heated glass is subjected to a shaping process prior to thermal tempering. Thus, the coated and heated glass may be bent, for example, prior to tempering. Bent panes may be obtained in this way, for example, for applications such as automotive windshields.

BRIEF DESCRIPTION OF THE DRAWING

The FIGURE shows a flow chart of a method for manufacturing a safety glass.

DETAILED DESCRIPTION

Referring to the FIGURE, according to a method for manufacturing a safety glass, a glass is coated with an aqueous coating solution and a surfactant mixture so as to provide a coated glass (see block 11). The aqueous coating solution has a pH of 3 to 8 and contains 0.5 wt. % to 5.0wt. % $[SiO_x(OH)_y]_n$ particles, where $0<y<4$ and $0<x<2$. The particles have a particle size of 10 nm to 60 nm. The coated glass is then dried (see block 12). The coated glass is annealed at temperatures of at least 600 degrees C. for a period of 2 to 10 minutes (see block 13). The coated glass is then tempered in an air flow (see block 14).

The method according to the present invention is elucidated in detail with reference to exemplary embodiments.

EXAMPLE 1

A hydrolysis mixture containing 4.9 L of water, 9.6 L of ethanol, and 250 g of 25% ammonia is prepared. A single portion of 1250 g of tetraethoxysilane annealed at 70° C. is added to this likewise annealed hydrolysis mixture under intensive stirring. A $SiO_2$ sol having a mean particle diameter of 25 nm with a tolerance of ±10% is obtained.

Subsequently, the reaction mixture is subjected to steam distillation to remove alcohol and ammonia. The aqueous $SiO_2$ sol obtained is adjusted to pH 8 and treated with 0.2 wt. % of a surfactant mixture containing 10.0 wt. % fatty alcohol ether sulfate (C12/C14 fatty alcohol, 2 mol EO), 5.6 wt. % alkylbenzene sulfonate, 5.5 wt. % fatty alcohol ethoxylate, and 8.9% water.

EXAMPLE 2

A glass pane previously cleaned using demineralized water and then dried, having the dimensions of 1 m×1 m and a thickness of 4 mm is dipped into the coating solution of Example 1 and pulled out at a constant pulling rate of 10 cm/min. Subsequently the coating is dried at room temperature either by simply letting it rest or by a forced air flow prior to being removed from the coating equipment, annealed, and tempered. The coated glass pane is placed in a horizontal tempering system in the furnace region heated to 700° C. and warmed for 160 seconds.

Subsequently the glass pane is tempered in an air shower for 120 seconds. A safety glass provided with an antireflection layer is obtained. When using low-iron glasses, a solar transmission of 95% is achieved compared to 90% with uncoated glass.

What is claimed is:

1. A method of manufacturing a safety glass, comprising:
coating a glass with an aqueous coating solution and a surfactant mixture, the aqueous coating solution having a pH of 3 to 8, containing 0.5 wt. % to 5.0 wt. % $[SiO_x(OH)_y]_n$ particles, where $0<y<4$ and $0<x<2$ and n is an integer, the particles having a particle size of 10 nm to 60 nm so as to provide a coated glass;
drying the coated glass;
annealing the coated glass at temperatures of at least 600° C. for a period of 2 to 10 minutes; and
tempering the coated glass in an air flow.

2. The method as recited in claim 1, wherein the glass is a soda-lime glass.

3. The method as recited in claim 1, wherein the drying includes one of resting the glass at room temperature and accelerated drying the glass using an air flow.

4. The method as recited in claim 1, wherein the tempering includes evenly tempering the coated glass on surfaces of both sides of the coated glass using an air flow.

5. The method as recited in claim 1, further comprising performing an intermediate treatment on the coated glass prior to the annealing.

6. The method as recited in claim 5, wherein the intermediate treatment includes dipping the coated glass in aqueous solution of inorganic salts or in pure water and subsequently annealing the coated glass at 50 to 300° C.

7. The method as recited in claim 1, further comprising shaping the coated glass prior to the tempering.

8. The method as recited in claim 1, wherein the safety glass is a cover of a solar panel.

9. The method as recited in claim 1, wherein the safety glass is a cover of a photovoltaic cell.

10. The method as recited in claim 1, wherein the safety glass is a windshield of a motor vehicle.

11. The method as recited in claim 1, wherein the safety glass is a construction glazing.

12. The method as recited in claim 1, wherein the pH of the aqueous solution is from 5 to 8.

* * * * *